United States Patent
Liu et al.

(10) Patent No.: US 9,965,868 B2
(45) Date of Patent: May 8, 2018

(54) AUTOMATIC GUIDING SYSTEM FOR ANALYZING GROUND TEXTURE AND METHOD FOR THE SAME

(71) Applicant: HON HAI PRECISION INDUSTRY CO., LTD., New Taipei (TW)

(72) Inventors: Tien-Ping Liu, New Taipei (TW); Horng-Juing Lee, New Taipei (TW); I-Hao Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 19 days.

(21) Appl. No.: 15/191,952

(22) Filed: Jun. 24, 2016

(65) Prior Publication Data

US 2017/0213352 A1    Jul. 27, 2017

(30) Foreign Application Priority Data

Jan. 26, 2016 (TW) .............................. 105102400 A

(51) Int. Cl.
| | |
|---|---|
| *G06F 17/30* | (2006.01) |
| *G06T 7/40* | (2017.01) |
| *G06K 9/62* | (2006.01) |
| *G06K 9/46* | (2006.01) |
| *G06T 7/00* | (2017.01) |
| *G01B 11/30* | (2006.01) |

(52) U.S. Cl.
CPC .............. *G06T 7/40* (2013.01); *G01B 11/303* (2013.01); *G06F 17/30241* (2013.01); *G06F 17/30262* (2013.01); *G06K 9/4604* (2013.01); *G06K 9/6202* (2013.01); *G06T 7/0085* (2013.01)

(58) Field of Classification Search
CPC ................. G06T 7/40; G06F 17/30241; G06F 17/30262; G06K 9/4604; G06K 9/6202; G01B 11/303

See application file for complete search history.

(56) References Cited

U.S. PATENT DOCUMENTS

| | | | |
|---|---|---|---|
| 9,701,016 B1* | 7/2017 | Urata | ....................... B25J 9/163 |
| 2015/0134079 A1* | 5/2015 | Yoon | ......................... A61F 2/68 |
| | | | 623/27 |

OTHER PUBLICATIONS

Filitchkin, Paul, and Katie Byl. "Feature-based terrain classification for littledog." In Intelligent Robots and Systems (IROS), 2012 IEEE/RSJ International Conference on, pp. 1387-1392. IEEE, 2012.*

(Continued)

*Primary Examiner* — Siamak Harandi
*Assistant Examiner* — Carol Wang
(74) *Attorney, Agent, or Firm* — ScienBiziP, P.C.

(57) ABSTRACT

An automatic guiding system for analyzing ground texture in or on an autonomous mobile device comprises an image acquisition module, a ground texture analysis module, a posture sensing module, and a ground texture database. The image acquisition module collects ground images as the autonomous mobile device moves. The ground texture analysis module processes the ground images, and extracts texture information of the ground images. The posture sensing module continuously senses the posture of the autonomous mobile device. The ground texture database is configured to stores the texture information and the posture.

13 Claims, 2 Drawing Sheets

(56) References Cited

OTHER PUBLICATIONS

Angelova, Anelia, Larry Matthies, Daniel Helmick, Gabe Sibley, and Pietro Perona. "Learning to predict slip for ground robots." In Robotics and Automation, 2006. ICRA 2006. Proceedings 2006 IEEE International Conference on, pp. 3324-3331. IEEE, 2006.*

Caballero, F., J. Perez, and L. Merino. "Long-term Ground Robot Localization Architecture for Mixed Indoor-Outdoor Scenarios." In ISR/Robotik 2014; 41st International Symposium on Robotics; Proceedings of, pp. 1-8. VDE, 2014.*

Chilian, Annett, Heiko Hirschmüller, and Martin Görner. "Multisensor data fusion for robust pose estimation of a six-legged walking robot." In Intelligent Robots and Systems (IROS), 2011 IEEE/RSJ International Conference on, pp. 2497-2504. IEEE, 2011.*

Lalonde, Jean-François, Nicolas Vandapel, Daniel F. Huber, and Martial Hebert. "Natural terrain classification using three-dimensional ladar data for ground robot mobility." Journal of field robotics 23, No. 10 (2006): 839-861.*

Belter, Dominik, and Piotr Skrzypczyński. "Rough terrain mapping and classification for foothold selection in a walking robot." Journal of Field Robotics 28, No. 4 (2011): 497-528.*

Brunner, Michael. "Rough terrain motion planning for actively reconfigurable mobile robots." (2015). Available from: http://publications.rwth-aachen.de/record/462738/files/462738.pdf.*

Dahlkamp, Hendrik, Adrian Kaehler, David Stavens, Sebastian Thrun, and Gary R. Bradski. "Self-supervised Monocular Road Detection in Desert Terrain." In Robotics: science and systems, vol. 38. 2006.*

Angelova, Anelia, Larry Matthies, Daniel Helmick, and Pietro Perona. "Slip prediction using visual information." In Proceedings of Robotics: Science and Systems. 2006.*

Stelzer, Annett, Heiko Hirschmüller, and Martin Görner. "Stereo-vision-based navigation of a six-legged walking robot in unknown rough terrain." The International Journal of Robotics Research 31, No. 4 (2012): 381-402.*

Walas, Krzysztof. "Terrain classification and negotiation with a walking robot." Journal of Intelligent & Robotic Systems 78, No. 3-4 (2015): 401.*

Lu, Liang, Camilo Ordonez, Emmanuel G. Collins, and Edmond M. DuPont. "Terrain surface classification for autonomous ground vehicles using a 2D laser stripe-based structured light sensor." In Intelligent Robots and Systems, 2009. IROS 2009. IEEE/RSJ International Conference on, pp. 2174-2181. IEEE, 2009.*

Görner, Martin, Annett Chilian, and Heiko Hirschmüller. "Towards an autonomous walking robot for planetary surfaces." (2010).*

Khan, Yasir Niaz, Andreas Masselli, and Andreas Zell. "Visual terrain classification by flying robots." In Robotics and Automation (ICRA), 2012 IEEE International Conference on, pp. 498-503. IEEE, 2012.*

Zenker, Steffen, Eren Erdal Aksoy, Dennis Goldschmidt, Florentin Wörgötter, and Poramate Manoonpong. "Visual terrain classification for selecting energy efficient gaits of a hexapod robot." In Advanced Intelligent Mechatronics (AIM), 2013 IEEE/ASME international conference on, pp. 577-584. IEEE, 2013.*

Takuma, Takashi, Koh Hosoda, and Minoru Asada. "Walking stabilization of biped with pneumatic actuators against terrain changes." In Intelligent Robots and Systems, 2005.(IROS 2005). 2005 IEEE/RSJ International Conference on, pp. 4095-4100. IEEE, 2005.*

\* cited by examiner

AUTOMATIC GUIDING SYSTEM FOR ANALYZING GROUND TEXTURE AND METHOD FOR THE SAME

CROSS-REFERENCE TO RELATED APPLICATIONS

This application claims all benefits accruing under 35 U.S.C. § 119 from TW Patent Application No. 105102400, filed on Jan. 26, 2016 in the TW Intellectual Property Office, the contents of which are hereby incorporated by reference.

FIELD

The subject matter herein generally relates to an automatic guiding system for analyzing ground texture and a method for the same.

BACKGROUND

Simultaneous localization and mapping (SLAM) is commonly used in autonomous mobile devices for positioning. SLAM means the autonomous mobile devices start from an unknown environment location, and establish their own location and posture by repeatedly observing map features during a movement; then incrementally constructing a map, so as to achieve a self-locating and map-constructing simultaneously.

However, a displacement or deviation of the autonomous mobile devices will be caused by an environment, such as large surface friction coefficient, ground potholes, or sand, during movement. The displacement or deviation of the autonomous mobile devices will affect future direction and distance of the autonomous mobile devices, and even cause the autonomous mobile devices to be dumped or destroyed.

BRIEF DESCRIPTION OF THE DRAWING

Implementations of the present technology will now be described, by way of example only, with reference to the attached figures, wherein.

DETAILED DESCRIPTION

Figure 1:
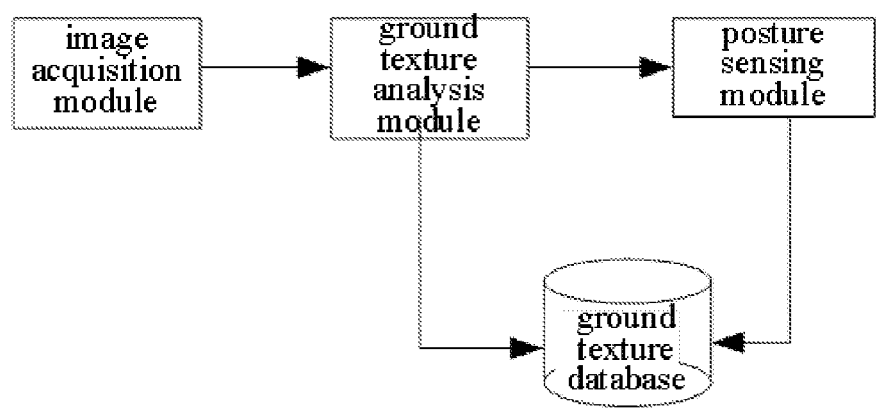
FIG. 1 is a schematic view of a module of an automatic guiding system for analyzing ground texture according to one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature described, such that the component need not be exactly conforming to such feature. The term "comprise," when utilized, means "include, but not necessarily limited to"; it specifically indicates open-ended inclusion or membership in the so-described combination, group, series, and the like.

Referring to FIG. 1, the present disclosure is described in relation to an automatic guiding system for analyzing ground texture. The automatic guiding system for analyzing ground texture comprises an image acquisition module, a ground texture analysis module, a posture sensing module, and a ground texture database. The image acquisition module is used to collect ground images in a direction of movement of an autonomous mobile device. The ground texture analysis module is connected with the image acquisition module. The ground texture analysis module is used for receiving and processing the ground images and extracting texture information from the ground images. The posture sensing module senses a posture of the autonomous mobile device as the autonomous mobile device moves. The ground texture database is used to store the texture information and the posture.

The autonomous mobile device can be any mobile device, such as robot or unmanned vehicle.

The image acquisition module comprises a camera. The camera is located on a side of the autonomous mobile device facing the direction of movement. The camera is used to shoot images of the ground texture. The ground texture can be a surface having a large friction coefficient, such as when there are potholes, sand, gravel, or dirt on the ground. The ground texture can also be relatively smooth, such as a flat ground. The camera can be a web camera based on Charge-coupled Device (CCD) or Complementary Metal Oxide Semiconductor (CMOS).

The ground texture analysis module and the image acquisition module are connected together. Signals of the ground images acquired by the image acquisition module are transmitted to the ground texture analysis module. The ground texture analysis module processes the ground image based on a computer vision technology, in order to extract texture information. The texture information can be described as feature information that can clearly distinguish the ground texture, such as "carpet," or "ceramic tile."

The posture sensing module comprises an inertial measurement unit (IMU). The IMU comprises a gyro. An azimuth of the autonomous mobile device can be obtained by the gyro; changes in the azimuth during movement can be obtained by a mathematical prediction model; and combining the texture information extracted by the ground texture analysis module; the posture of the autonomous mobile device can be predicted. The mathematical prediction model can be Kalman filtering.

The ground texture database stores the texture information of the ground images and the posture corresponding to the texture information of each ground image. Such as the texture information "carpet" corresponding to the posture "acceleration to 30 km/h", and the texture information "ceramic tile" corresponding to the posture "acceleration to 50 km/h". The ground texture database classified stores the texture information of the ground images, and the texture information can be presented in a text form. Developing and refining the texture information continuously, and corrections to the posture corresponding to the texture information can be continuously applied, in order to maintain safety of the autonomous mobile device.

The texture information of the ground images corresponds to the posture of the autonomous mobile device. The postures stored in the ground texture database can not be repeated to prevent confusion.

The automatic guiding system for analyzing ground texture further comprises a positioning module, such as a global positioning system (GPS) device. The positioning module is used to obtain a geographical location of the autonomous mobile device on a ground. The positioning module in combination with the ground texture database inputs the postures of the autonomous mobile device in different environments at different times into a cloud storage system. Data as to one road section under different environments can be analyzed for obtaining an ideal posture of that road section, and the ideal posture is stored in the ground texture database. Other autonomous mobile devices can pass through the road section smoothly and safety just by downloading the ground texture database.

The automatic guiding system for analyzing ground texture further comprises a data validation module. The data validation module is connected with the ground texture analysis module and the ground texture database. The data validation module is used to determine if the texture information extracted by the ground texture analysis module matches the texture information stored in the ground texture database. In this context, "matches" means that the texture information extracted by the ground texture analysis module is substantially the same as that stored in the ground texture database.

Figure 2:
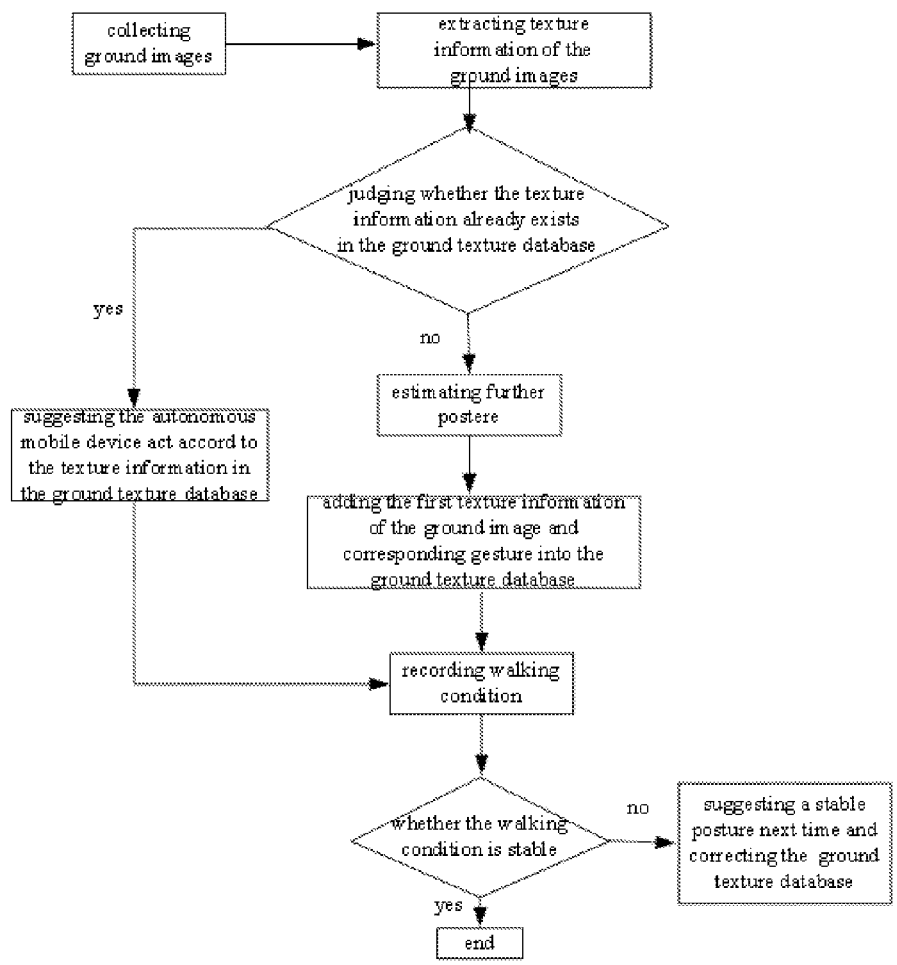
FIG. 2 is a flow chart of an automatic guiding system for analyzing ground texture according to one embodiment.

FIG. 2 illustrates one embodiment of a method for the automatic guiding system for analyzing ground texture comprising the following steps:
S1: providing an autonomous mobile device having the automatic guiding system for analyzing ground texture;
S2: collecting the ground images of the autonomous mobile device in the direction of movement by the image acquisition module, and transmitting the ground images to the ground texture analysis module;
S3: processing the ground images by the ground texture analysis module, and extracting first texture information of the ground images;
S4: sensing the posture of the autonomous mobile device by the posture sensing module, while the autonomous mobile device is on the ground having the first texture information;
S5: comparing the first texture information of the ground images and second texture information stored in the ground texture database, judging whether the first texture information of the ground images already exists in the ground texture database; if "yes", finding out the first texture information in the ground texture database, and suggesting the autonomous mobile device act accordingly based on the gesture corresponding to the first texture information in the ground texture database; if "no", adding the first texture information of the ground image and corresponding gesture into the ground texture database; and
S6: recording a walking condition of the autonomous mobile device.

In step S3, a method of processing the ground images by the ground texture analysis module can comprise the following steps:
S31: extracting a sub-image constituted by an odd-line pixel;
S32: processing the ground images by a median filtering algorithm to reduce noise in the ground images; and
S33: extracting edge points by Canny edge detector.

In step S4, the posture means acceleration, elevation, speed and other information of the autonomous mobile device, while the autonomous mobile device is on the ground texture.

In step S6, the autonomous mobile device walks according to the posture of the ground texture database. Reading an output data of the gyro at intervals during walking, and analyzing the output data, such as creating a chart. If the output data of the gyro is less than a preset threshold value, a walking condition is "stable". If the output data of the gyro is larger than the preset threshold value, a walking condition is "unstable". When the output data of the gyro is larger than the preset threshold value, feeding the walking condition and the output data of the gyro back to the autonomous mobile device, and suggesting a relatively stable posture when the autonomous mobile device walks on the same ground next time. The "unstable" comprises the autonomous mobile device shaking or dumping. The preset threshold value is a data by artificially setting. The data is a threshold of the posture of stable walking and the posture of unstable walking.

If the autonomous mobile device walks with an instable posture on one ground texture, when the autonomous mobile device walks on that ground texture next time, the autonomous mobile device will be suggested to walk with the relatively stable posture based on the instable posture and the output data of the gyro. And replacing the instable posture in the ground texture database with the relatively stable posture to gradually optimize the ground texture database.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:
1. An automatic guiding system of an autonomous mobile device for analyzing a ground texture comprising:
an image acquisition module configured to collect ground images in a direction of movement of the autonomous mobile device;
a ground texture analysis module connected with the image acquisition module, wherein the ground texture analysis module is configured to receive and process the ground images, and extract a first texture information of the ground images: wherein the ground texture analysis module is a first processor:

a posture sensing module configured to sense a first posture of the autonomous mobile device;

a ground texture database that has stored a second texture information and the first posture; and a data validation module connected with the ground texture analysis module, wherein the data validation module is configured to judge whether the first texture information is the same as the second texture information, when the first texture information is the same as the second texture information, suggesting the autonomous mobile device to act accordingly based on the first posture corresponding to the second texture information; and when the first texture information is not the same as the second texture information, adding the first texture information and corresponding posture into the ground texture database; wherein the data validation module is a second processor.

2. The system of claim 1, wherein the ground texture is selected from the group consisting of potholes, sand, gravel, and dirt.

3. The system of claim 1, wherein the ground texture comprises a flat ground.

4. The system of claim 1, wherein the ground texture database includes classified second texture information.

5. The system of claim 4, wherein the texture information is presented in a text form.

6. The system of claim 1, wherein the image acquisition module comprises a camera located on a side of the autonomous mobile device that faces to the direction of movement.

7. The system of claim 1, further comprising a positioning module.

8. The system of claim 7, wherein the positioning module comprises a global positioning system.

9. A method for an automatic guiding system comprising:
step (S1): providing an autonomous mobile device having the automatic guiding system;
step (S2): collecting ground images of the autonomous mobile device in a direction of movement by an image acquisition module, and transmitting the ground images of the autonomous mobile device in the direction of movement to a ground texture analysis module;
S3: processing the ground images by the ground texture analysis module, and extracting a first texture information of the ground images;
S4: sensing a posture of the autonomous mobile device by a posture sensing module;
S5: comparing the first texture information of the ground images and a second texture information stored in a ground texture database, when the first texture information of the ground images exists in the ground texture database, finding out the first texture information in the ground texture database, and suggesting the autonomous mobile device to act accordingly based on a first posture corresponding to the first texture information in the ground texture database; and when the first texture information of the ground images does not exist in the ground texture database, adding the first texture information of the ground images and corresponding posture into the ground texture database; and S6: recording a condition of the autonomous mobile device.

10. The method of claim 9, wherein a method of processing the ground images by the ground texture analysis module comprises:
S31: extracting a sub-image constituted by an odd-line pixel;
S32: processing the ground images by a median filtering algorithm to reduce noise in the ground images; and
S33: extracting edge points by a Canny edge detector.

11. The method of claim 9, wherein a method of recording the condition of the autonomous mobile device comprises: the autonomous mobile device walks according to the posture of the ground texture database; reading an output data of a gyro of the posture sensing module at intervals during movement, and analyzing the output data; and when the output data of the gyro is less than a preset threshold value, the condition is "stable", when the output data of the gyro is larger than the preset threshold value, the condition is "unstable".

12. The method of claim 11, wherein when the condition is "unstable", feeding the condition and the output data of the gyro back to the autonomous mobile device, and suggesting a stable posture when the autonomous mobile device walks on a same ground next time; and storing the stable posture in the ground texture database.

13. A method for an automatic guiding system comprising:
step (S1): providing an autonomous mobile device having the automatic guiding system;
step (S2): collecting ground images of the autonomous mobile device in a direction of movement by an image acquisition module, and transmitting the ground images of the autonomous mobile device in the direction of movement to a ground texture analysis module;
S3: processing the ground images by the ground texture analysis module, and extracting a first texture information of the ground images;
S4: sensing a first posture of the autonomous mobile device by a posture sensing module;
S5: comparing the first texture information of the ground images and a second texture information stored in a ground texture database, when the first texture information of the ground images exists in the ground texture database, finding out the first texture information in the ground texture database, and suggesting the autonomous mobile device to act accordingly based on a first posture corresponding to the first texture information in the ground texture database; and when the first texture information of the ground images does not exist in the ground texture database, adding the first texture information of the ground images and a second posture corresponding to the first texture information into the ground texture database, wherein the autonomous mobile device acts based on the second posture; and
S6: recording a condition of the autonomous mobile device.

* * * * *